(12) United States Patent
Kaneko et al.

(10) Patent No.: US 7,478,624 B2
(45) Date of Patent: Jan. 20, 2009

(54) IGNITION TIMING CONTROL DEVICE OF INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Koji Aso, Susono (JP); Kenji Senda, Okazaki (JP); Shigeru Kamio, Nagoya (JP); Yuichi Takemura, Anjo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 11/471,540

(22) Filed: Jun. 21, 2006

(65) Prior Publication Data

US 2006/0288982 A1 Dec. 28, 2006

(30) Foreign Application Priority Data

Jun. 28, 2005 (JP) ............................. 2005-188556

(51) Int. Cl.
*F02P 5/00* (2006.01)
*G01L 23/22* (2006.01)
(52) U.S. Cl. ..................... 123/406.37; 123/406.38; 123/406.39; 701/111; 73/35.01; 73/35.04; 73/35.06
(58) Field of Classification Search ............ 123/406.37, 123/406.39, 406.38; 701/111; 73/35.01, 73/35.04, 35.06
See application file for complete search history.

(56) References Cited

U.S. PATENT DOCUMENTS

| | | | | |
|---|---|---|---|---|
| 4,452,069 A | * | 6/1984 | Hattori et al. | ............. 73/35.12 |
| 7,043,353 B2 | * | 5/2006 | Takemura et al. | ........... 701/111 |
| 7,281,516 B2 | * | 10/2007 | Kaneko et al. | ......... 123/406.38 |

FOREIGN PATENT DOCUMENTS

| | | |
|---|---|---|
| JP | 1-315649 | 12/1989 |
| JP | 2003-21032 | 1/2003 |
| JP | 2004353531 A | * 12/2004 |

* cited by examiner

*Primary Examiner*—Stephen K Cronin
*Assistant Examiner*—J. Page Hufty
(74) *Attorney, Agent, or Firm*—Oblon, Spivak, McClelland, Maier & Neustadt, P.C.

(57) ABSTRACT

An engine ECU executes a program including a step of calculating intensity values LOG(V), a step of detecting vibration waveforms, a step of calculating a correlation coefficient K based on vibration waveforms, a step of preparing frequency distribution of intensity values LOG(V) smaller than a threshold V(1) and intensity values LOG(V) in an ignition cycle where correlation coefficient K is larger than a threshold K(1), a step of calculating a knock determination level V(KD) based on a median V(50) and a standard deviation σ of intensity values LOG(V), and a step of counting the number of intensity values LOG(V) larger than knock determination level V(KD) as the number of times that knocking has occurred.

22 Claims, 8 Drawing Sheets

IGNITION TIMING CONTROL DEVICE OF INTERNAL COMBUSTION ENGINE

This nonprovisional application is based on Japanese Patent Application No. 2005-188556 filed with the Japan Patent Office on Jun. 28, 2005, the entire contents of which are hereby incorporated by reference.

BACKGROUND OF THE INVENTION

1. Field of the Invention

The present invention relates to a technique for controlling ignition timing of an internal combustion engine, and in particular, to a technique in which a plurality of intensity values relating to the intensity of vibration of the internal combustion engine are detected, and based on the intensity values and the number (frequency) of each intensity value, ignition timing of the internal combustion engine is controlled.

2. Description of the Background Art

In general, a knock determination level is set by multiplying an average value of knock sensor signals with a constant K. Such a KCS (Knock Control System) involves a problem that an optimum K value changes depending on manufacturing variations or temporal changes of engines, knock sensors or the like, whereby knock detection will not be able to be performed accurately. In order to solve this problem, there is a technique for determining presence or absence of knock based on the distribution profile of knock sensor signals.

A knock controlling device for an internal combustion engine described in the publication of Japanese Laid-Open Patent Publication No. 01-315649 includes: a knock sensor for detecting knock in the internal combustion engine; a knock intensity value detector for detecting knock intensity values V effective for knock detection from signals of the knock sensor; a knock determiner for determining presence or absence of knock by comparing knock intensity values with a knock determination level; a knock controller for controlling knock control factors such as ignition timing or air fuel ratio based on the determination result; a cumulative % point detector for detecting cumulative % point VP of distribution of almost logarithmically converted values of knock intensity values V each time knock intensity value V is inputted; a standard deviation detector for detecting an actual standard deviation value S of almost logarithmically converted values of the knock intensity values each time knock intensity value V is inputted; and a knock determination level setting unit for setting a knock determination level VKD by $VKD = S^n \times VP$ (where $n \geq 2.5$) based on cumulative % point VP and actual standard deviation values S. Among detected knock intensity values V, those higher than knock determination level VKD are determined as knock intensity values V caused by knocking. That is, the number (frequency) of knock intensity values higher than knock determination level VKD are determined as the number of times (frequency) that knocking has occurred.

According to the knock controlling device described in this publication, cumulative % point VP of distribution of almost logarithmically converted values of knock intensity values V detected by the knock intensity value detector is detected by the cumulative % point detector each time knock intensity value V is inputted, and the actual standard deviation value of the almost logarithmically converted values of knock intensity values V is detected each time knock intensity value V is inputted. Then, based on cumulative % point VP and the actual standard deviation value, the knock determination level is set by $VKD = S^n \times VP$ by the knock determination level setting unit, and the knock determination level and knock intensity values are compared by the knock determiner, whereby presence or absence of knock is determined.

Vibration due to operation of a piston slap or an injector or seating of an intake valve or an exhaust valve is caused irrespective of whether knocking being present, so if knock intensity values V are detected from such vibration, a knocking occurrence state may not be determined correctly, whereby ignition timing may not be controlled by performing retarding or advancing of ignition timing. Therefore, knock intensity values V must be detected while eliminating vibration of noise components. However, in a knock control device for an internal combustion engine described in the publication of Japanese Laid-Open Patent Publication No. 01-315649, such a problem is not considered at all.

SUMMARY OF THE INVENTION

It is an object of the present invention to provide an ignition timing control device of an internal combustion engine capable of controlling ignition timing appropriately.

An ignition timing control device of an internal combustion engine according to the present invention includes: a first detector for detecting intensity values relating to the intensity of vibration caused in the internal combustion engine in a predetermined first interval for a crank angle in a plurality of ignition cycles; a second detector for detecting waveforms of vibration caused in the internal combustion engine in a predetermined second interval for a crank angle in a plurality of ignition cycles; a storage for previously storing a waveform of vibration of the internal combustion engine; a calculator for calculating a value relating to a deviation between the detected waveform and the stored waveform based on a result of comparing the detected waveform with the stored waveform; and a controller for controlling ignition timing of the internal combustion engine based on intensity values satisfying a predetermined first condition and intensity values in an ignition cycle in which a value relating to a deviation satisfying a predetermined second condition is calculated, among the plurality of intensity values.

According to the present invention, intensity values relating to the intensity of vibration caused in the internal combustion engine in a predetermined first interval for a crank angle are detected. Further, waveforms of vibration caused in the internal combustion engine in a predetermined second interval for a crank angle are detected. Based on the result of comparing the waveforms with a stored waveform, a value relating to a deviation is calculated. This value relating to a deviation is calculated to be smaller if the detected waveforms include waveforms of vibration caused due to operation of a predetermined component (vibration of a noise component) of the internal combustion engine, compared with the case of not including them. A product of a standard deviation and a coefficient is added to the median of the detected intensity values, whereby a knock determination level is calculated, and the number of intensity values larger than the knock determination level is determined as the number of times that knocking has occurred. Note that vibration of a noise component occurs irrespective of knocking being present or absent. Therefore, if the detected intensity values include intensity values of vibration of a noise component, a knocking occurrence state may not be determined correctly, whereby retarding or advancing of ignition timing may not be performed appropriately. If vibration of a noise component is caused, detected intensity values become larger. Further, in an ignition cycle in which waveforms of vibration of a noise component are detected, a value relating to a deviation is calculated to be small. Therefore, intensity values, which are larger than the first value and are in an ignition cycle in which a value relating to a deviation smaller than the second value is calculated, can be considered as intensity values of vibration of a noise component. Therefore, ignition timing is controlled based on intensity values which are smaller than the first value and intensity values in an ignition cycle in which a value relating to a deviation larger than the second value is calculated. For example, based on intensity values smaller than the first value and intensity values in an ignition cycle in which a value relating to a deviation larger than the second value is calculated, the number of times that knocking has occurred is determined, and ignition timing is controlled based on the number of times that knocking has occurred. In other words, intensity values, which are larger than the first value and are in an ignition cycle in which a value relating to a deviation smaller than the second value is calculated, are excluded from the detected intensity values, and the number of times that knocking has occurred is determined. Based on the determined number of times, ignition timing can be controlled. Therefore, it is possible to determine the number of times that knocking has occurred based on intensity values considered as not intensity values of vibration of a noise component, and based on the determination result, to control ignition timing. Consequently, it is possible to suppress influence of noise and to control ignition timing. As a result, it is possible to provide an ignition timing controlling device of an internal combustion engine capable of controlling ignition timing appropriately.

Preferably, the ignition timing control device further includes a determiner for determining the number of times that knocking has occurred based on intensity values satisfying the predetermined first condition and intensity values in an ignition cycle in which a value relating to a deviation satisfying the predetermined second condition is calculated, among the plurality of intensity values. The controller controls ignition timing of the internal combustion engine based on the number of times that knocking has occurred.

According to the present invention, the number of times that knocking has occurred is determined based on intensity values satisfying a predetermined first condition and intensity values in an ignition cycle in which a value relating to a deviation satisfying a predetermined second condition is calculated. A value relating to a deviation is calculated to be smaller if, for example, detected waveforms include waveforms of vibration due to operation of a predetermined component (vibration of a noise component) of the internal combustion engine, compared with the case of not including them. A knock determination level is calculated by adding a product of a standard deviation and a coefficient to the median of the detected intensity values, and the number of intensity values larger than the knock determination level is determined as the number of times that knocking has occurred. Note that vibration of a noise component occurs irrespective of knocking being present or absent. Therefore, if the detected intensity values include intensity values of vibration of a noise component, the number of times that knocking has occurred may not be determined correctly. When vibrations of a noise component are caused, detected intensity values become larger. Further, in an ignition cycle in which waveforms of vibration of a noise component are detected, a value relating to a deviation is calculated to be small. Therefore, intensity values, which are larger than the first value and are in an ignition cycle in which a value relating to a deviation smaller than the second value is calculated, can be considered as intensity values of vibration of a noise component. Therefore, for example, based on intensity values satisfying a condition of smaller than the first value and intensity values in an ignition cycle in which a value relating to a deviation satisfying a condition of larger than the second value is calculated, the number of times that knocking has occurred is determined. In other words, intensity values, which are larger than the first value and are in an ignition cycle in which a value relating to a deviation smaller than the second value is calculated, are excluded from the detected intensity values, and the number of times that knocking has occurred is determined. Thereby, it is possible to determine the number of times that knocking has occurred based on intensity values considered as not intensity values of vibration of a noise component. Therefore, the number of times that knocking has occurred can be determined while suppressing influence of a noise. Consequently, it is possible to determine the number of times that knocking has occurred with high accuracy. Based on the number of times that knocking has occurred determined in this manner, ignition timing is controlled. Thereby, ignition timing of the internal combustion engine can be controlled appropriately.

More preferably, the ignition timing control device of the internal combustion engine further includes a determination value calculator for calculating a knocking determination value based on intensity values satisfying a first condition and intensity values in an ignition cycle in which a value relating to a deviation satisfying a second condition is calculated. The determiner determines the number of intensity values larger than a knocking determination value, among intensity values satisfying a first condition and intensity values in an ignition cycle in which a value relating to a deviation satisfying a second condition is calculated, as the number of times that knocking has occurred.

According to the present invention, it is possible to determine the number of times that knocking has occurred by comparing intensity values with a knocking determination value.

More preferably, the first condition is a condition of smaller than a predetermined first value.

According to the present invention, ignition timing is controlled based on intensity values satisfying a condition of smaller than the first value. At this time, intensity values of vibration due to a noise component may become larger than the first value. Thereby, intensity values considered as intensity values of vibration of a noise component can be excluded. Therefore, it is possible to control ignition timing appropriately based on intensity values considered as not being caused by vibration of a noise component.

More preferably, the first value is a median of intensity values detected in a state where the internal combustion engine is operated such that vibration due to operation of a predetermined component of the internal combustion engine is not to be caused in the first interval.

According to the present invention, a median of intensity values, detected in a state where the internal combustion engine is operated such that vibration due to operation of a predetermined component is not to be caused in the first interval, is used as the first value. Ignition timing is controlled based on intensity values satisfying a condition of smaller than the median. At this time, intensity values of vibration due to a noise component may be larger than the median. Thereby, intensity values which can be considered as intensity values of vibration of a noise component can be excluded. Therefore, it is possible to control ignition timing appropriately based on intensity values which can be considered as not being caused by vibration of a noise component.

More preferably, the predetermined component is at least one of a piston, an injector, an intake valve and an exhaust valve.

According to the present invention, it is possible to control ignition timing appropriately by suppressing a noise component generated due to at least one of a piston, an injector, an intake valve and an exhaust valve.

More preferably, the calculator calculates a value relating to a deviation to be smaller if the detected waveforms include waveforms of vibration due to operation of a predetermined component of the internal combustion engine, compared with the case of not including them. The second condition is a condition of larger than a predetermined second value.

According to the present invention, ignition timing is controlled based on intensity values in an ignition cycle in which a value relating to a deviation satisfying a condition of larger than the second value is calculated. At this time, if detected waveforms include waveforms of vibration of a noise component, a value relating to a deviation may be calculated smaller than the second value. Thereby, intensity values considered as intensity values of vibration of a noise component can be excluded. Therefore, it is possible to control ignition timing appropriately based on intensity values considered as not intensity values of vibration of a noise component.

More preferably, the second value is a maximum value of a value relating to a deviation calculated in a state where the internal combustion engine is operated such that vibration is caused by operation of the predetermined component in the second interval.

According to the present invention, ignition timing is controlled based on intensity values in an ignition cycle in which a value relating to a deviation satisfying a condition of larger than the maximum value of a value relating to a deviation when a waveform of vibration including a noise component is detected is calculated. At this time, if detected waveforms include waveforms of vibration of a noise component, a value relating to a deviation is calculated smaller than the maximum value. Thereby, intensity values considered as intensity values of vibration of a noise component can be excluded. Therefore, it is possible to control ignition timing appropriately based on intensity values considered as not intensity values of vibration of a noise component.

More preferably, the predetermined component is at least one of a piston, an injector, an intake valve and an exhaust valve.

According to the present invention, it is possible to control ignition timing appropriately by suppressing a noise component generated due to at least one of a piston, an injector, an intake valve and an exhaust valve.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
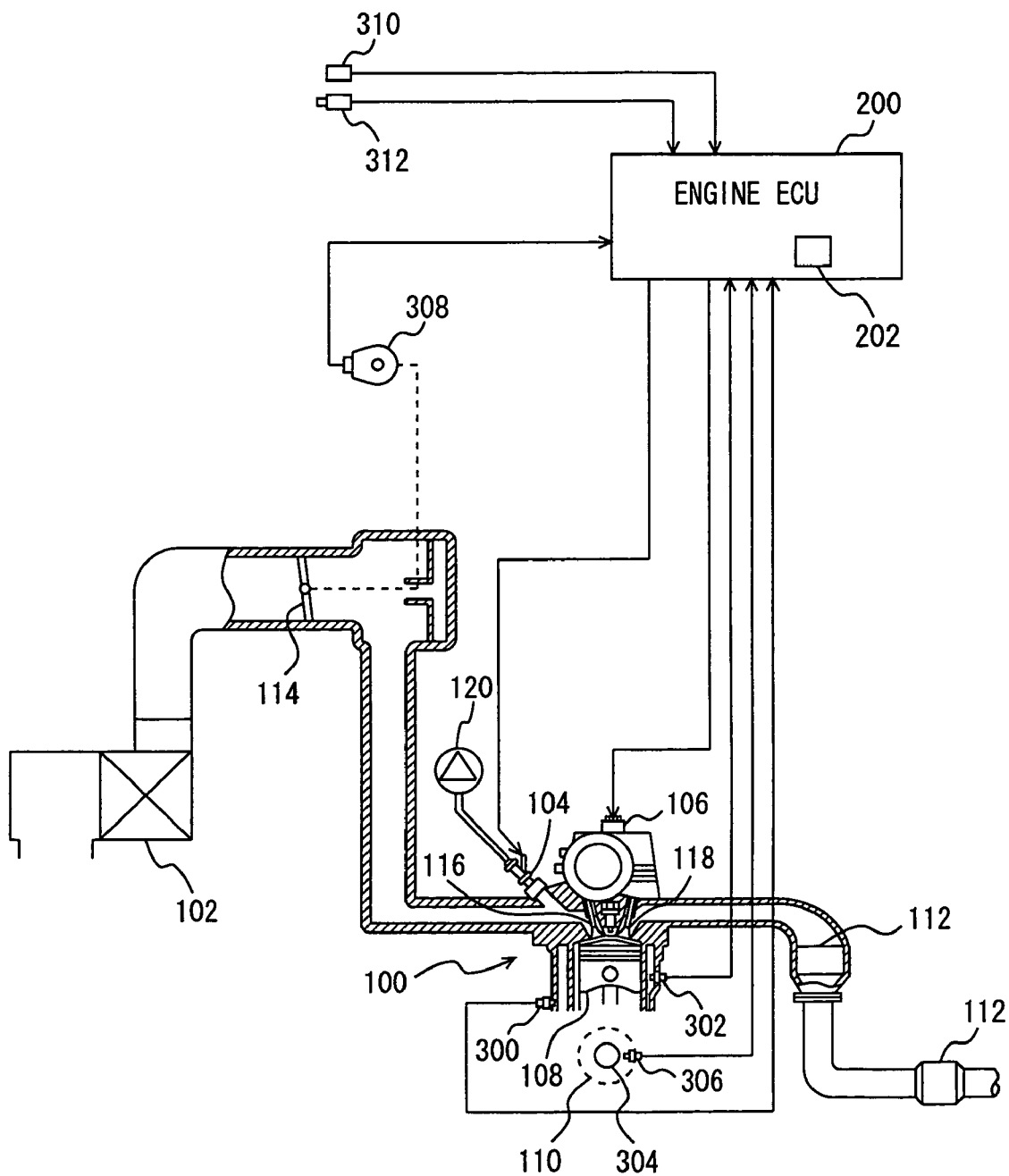
FIG. 1 is a schematic configuration diagram showing an engine controlled by an engine ECU which is an ignition timing control device of an internal combustion engine according to an embodiment of the present invention.

Hereinafter, an embodiment of the present invention will be described with reference to the drawings. In the description below, same components are denoted by same reference numerals. Their names and functions are same. Therefore, detailed description thereof will not be repeated.

Referring to FIG. 1, an engine 100 of a vehicle mounting an ignition timing control device of an internal combustion engine according to an embodiment of the present invention will be described. The ignition timing control device of the internal combustion engine according to the present embodiment is realized by a program executed by an engine ECU (Electronic Control Unit) 200 for example.

Engine 100 is an internal combustion engine which ignites an air taken from an air cleaner 102 and an air-fuel mixture injected from an injector 104 with an ignition plug 106 in a combustion chamber and burns them. Injector 104 may be one which injects fuel into an intake manifold, or one which directly injects a fuel into a cylinder.

When the air-fuel mixture is burnt, a piston 108 is pressed downward by a combustion pressure, and a crankshaft 110 rotates. The burnt air-fuel mixture (exhaust gas) is purified by a three way catalyst 112, and then discharged to the outside of the vehicle. The amount of air taken into engine 100 is regulated by a throttle valve 114.

Engine 100 is controlled by engine ECU 200. Engine ECU 200 is connected with a knock sensor 300, a water temperature sensor 302, a crank position sensor 306 provided opposite to a timing rotor 304, a throttle opening sensor 308, a vehicle speed sensor 310, and an ignition switch 312.

Knock sensor 300 consists of a piezoelectric element. Knock sensor 300 generates voltage by vibration of engine 100. The magnitude of voltage corresponds to the magnitude of vibration. Knock sensor 300 transmits signals indicating voltage to engine ECU 200. Water temperature sensor 302 detects temperature of cooling water inside a water jacket of engine 100, and transmits signals indicating the detection result to engine ECU 200.

Timing rotor 304 is provided to a crank shaft 110, and rotates together with crank shaft 110. On the outer periphery of timing rotor 304, a plurality of protrusions are provided at predetermined intervals. Crank position sensor 306 is provided opposite to the protrusions of timing rotor 304. When timing rotor 304 rotates, an air gap between the protrusions of timing rotor 304 and crank position sensor 306 changes, so a magnetic flux passing through a coil part of crank position sensor 306 increases or decreases, whereby electromotive force is generated in the coil part. Crank position sensor 306 transmits a signal indicating the electromotive force to engine ECU 200. Engine ECU 200 detects a crank angle based on the signal transmitted from crank position sensor 306.

Throttle opening sensor 308 detects throttle opening and transmits a signal indicating the detection result to engine ECU 200. Vehicle speed sensor 310 detects the number of rotations of a wheel (not shown), and transmits a signal indicating the detection result to engine ECU 200. Engine ECU 200 calculates the vehicle speed from the number of rotations of the wheel. Ignition switch 312 is operated to be turned on by a driver before starting engine 100.

Engine ECU 200 performs computation based on signals transmitted from each sensor and ignition switch 312 and a map and a program stored on a memory 202, and controls machinery so that engine 100 becomes to be in a desired operating state.

In the present embodiment, engine ECU 200 detects a waveform of vibration of engine 100 in a predetermined knock detection gate (a section from a predetermined first crank angle to a predetermined second crank angle) based on the signal and the crank angle transmitted from knock sensor 300, and based on the detected vibration waveform, determines whether knocking occurs in engine 100. The knock detection gate in the present embodiment is from a top dead center (0 degree) to 90 degrees in the combustion process. Note that the knock detection gate is not limited to this.

Figure 2:
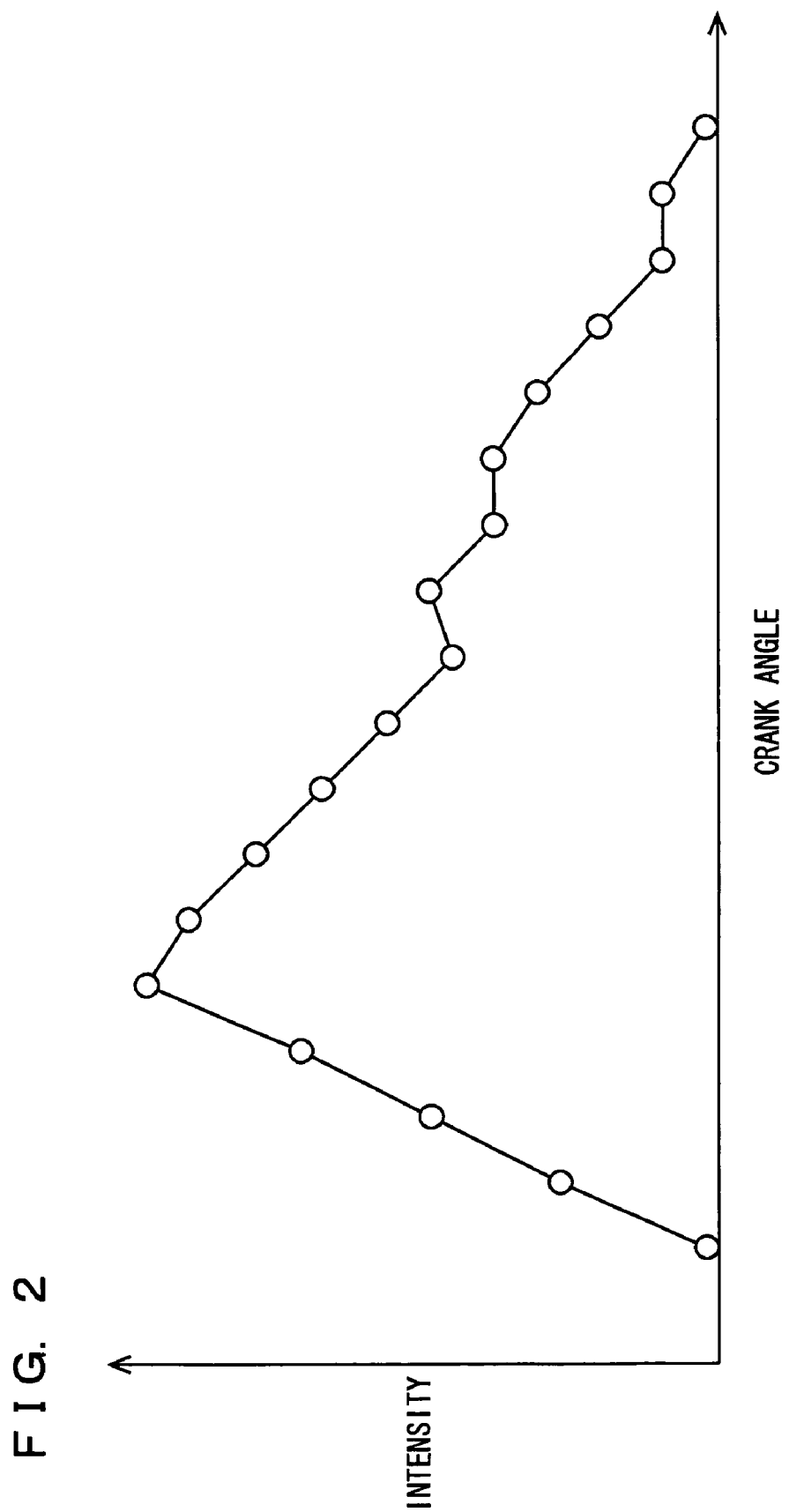
FIG. 2 is a chart showing a vibration waveform of the engine.

As shown in FIG. 2, a vibration waveform is indicated by a value in which an output voltage value (value indicating the intensity of vibration) of knock sensor 300 is integrated by 5 degrees (only for 5 degrees) at the crank angle. Note that the intensity of vibration may be indicated by a value corresponding to an output voltage value of knock sensor 300.

Figure 3:
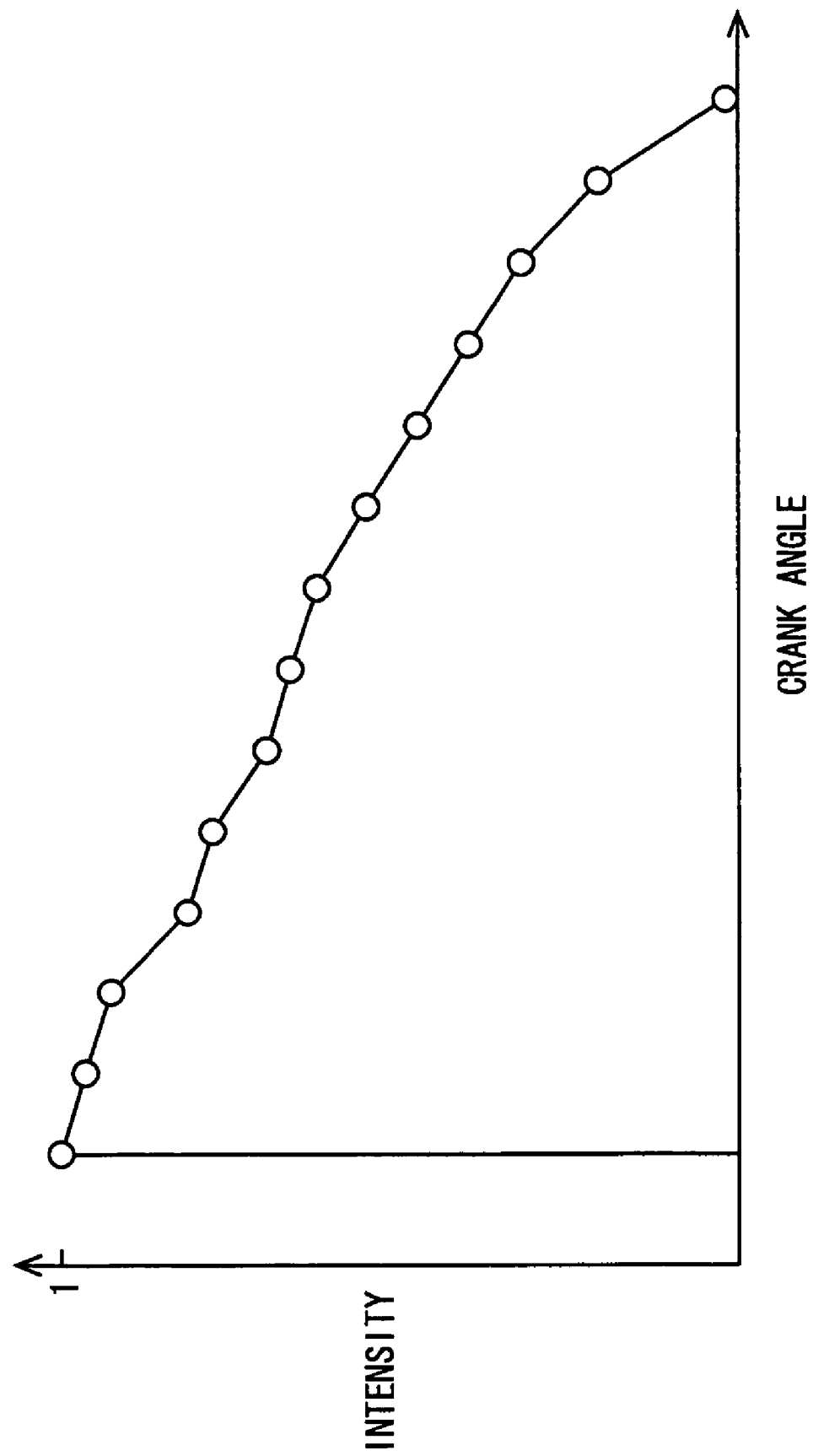
FIG. 3 is a chart showing a knock waveform model stored on a memory of the engine ECU.

The detected vibration waveform is compared with the knock waveform model stored on memory 202 of engine ECU 200 as shown in FIG. 3. The knock waveform model is previously created as a model of a vibration waveform of the case where knocking occurs in engine 100.

In the knock waveform model, the intensity of vibration is indicated as a dimensionless number of 0 to 1, and the intensity of vibration does not correspond to the crank angle unambiguously. That is, in the knock waveform model of the present embodiment, it is defined that the intensity of vibration decreases as the crank angle becomes larger after a peak value of the intensity of vibration, but a crank angle where the intensity of vibration shows a peak value is not defined.

The knock waveform model of the present embodiment corresponds to vibration after the peak value of the intensity of vibration caused by knocking. Note that a knock waveform model corresponding to vibration after rising of vibration due to knocking may be stored.

Through experimentations or the like, the knock waveform model detects a vibration waveform of engine 100 when forcibly causing knocking, and is created and stored previously based on the vibration waveform.

A knock waveform model is created by using engine 100 in which the dimension of engine 100 and an output value of knock sensor 300 are medians of dimensional tolerance and tolerance of output values of knock sensor 300 (hereinafter described as a characteristic center engine). That is, a knock waveform model is a vibration waveform when forcibly causing knocking in the characteristic center engine.

Note that a method of creating a knock waveform model is not limited to this, and it may be created by simulation. Engine ECU 200 compares a detected waveform and a stored knock waveform model, and determines whether knocking has occurred in engine 100.

Figure 4:
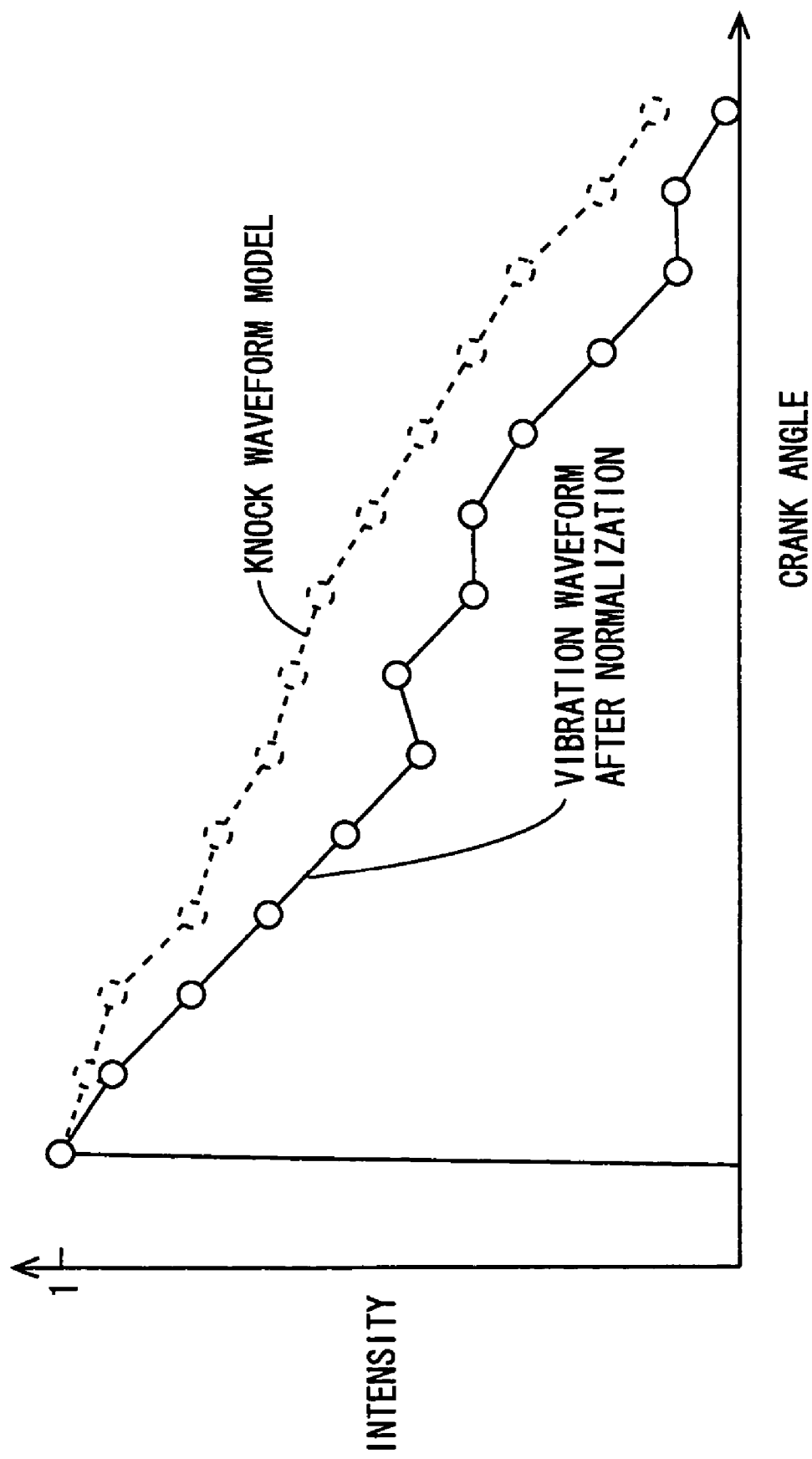
FIG. 4 is a chart showing a state of comparing a normalized vibration waveform and a knock waveform mode.
Figure 5:
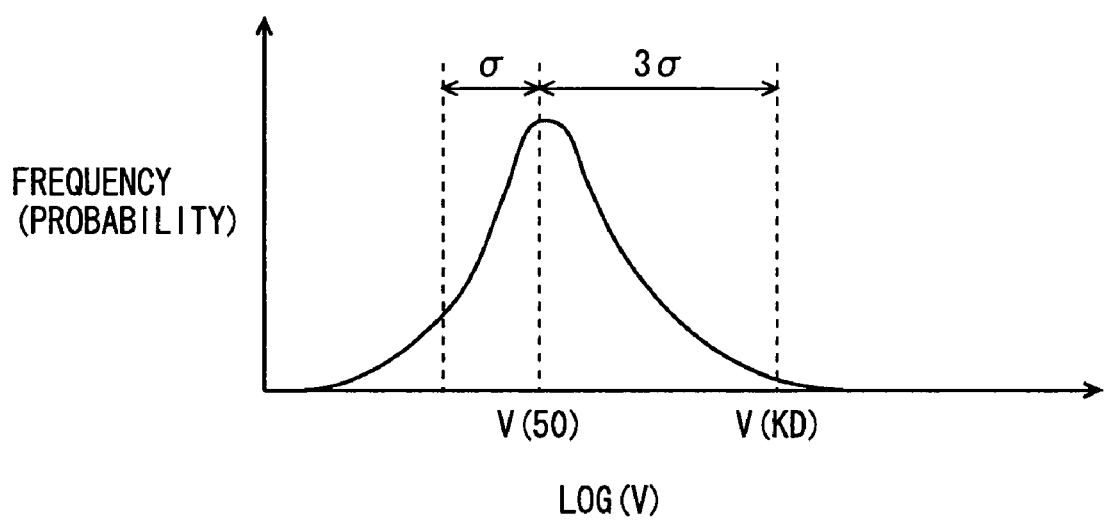
FIG. 5 is a chart showing frequency distribution of intensity values LOG(V)

In comparing the detected waveform and the knock waveform model, a normalized waveform and the knock waveform model are compared as shown in FIG. 4. Here, normalization means that the intensity of vibration is indicated as a dimensionless number of 0 to 1 by dividing by the maximum value of the integrated value in the detected vibration waveform by each integration value. Note that a normalization method is not limited to this.

In the present embodiment, engine ECU 200 calculates a correlation coefficient K which is a value relating to a deviation between a normalized waveform and a knock waveform model. In a state where timing at which the intensity of vibration in a vibration waveform after normalization and timing at which the intensity of vibration in a knock waveform model, an absolute value (shift amount) of the deviation between the vibration waveform after normalization and the knock waveform model is calculated by a crank angle (by 5 degrees), whereby the correlation coefficient K is calculated.

Assuming that an absolute value of a deviation between a vibration waveform after normalization and a knock waveform model by a crank angle is $\Delta S(I)$ (I is a natural number) and a value in which the intensity of vibration in the knock waveform model is integrated with the crank angle (area of the knock waveform model) is S, correlation coefficient K is calculated by an equation of $K=(S-\Sigma \Delta S(I))/S$. Here, $\Sigma \Delta S(I)$ is the total of $\Delta S(I)$. In the present embodiment, correlation coefficient K is calculated to be a larger value as the shape of a vibration waveform resembles the knock waveform model. Therefore, when a waveform of vibration caused due to a reason other than knocking is included in vibration waveforms, correlation coefficient K is calculated to be smaller. Note that a method of calculating correlation coefficient K is not limited to this.

Further, engine ECU 200 calculates a knock intensity N based on correlation coefficient K and the maximum value (peak value) of integrated values. Assuming that the maximum value of integrated values is P, and a value indicating vibration of engine 100 in a state where knocking has not occurred in engine 100 is BGL (Back Ground Level), knock intensity N is calculated by an equation of $N=P \times K/BGL$. BGL is stored on memory 202. Note that a method of calculating knock intensity N is not limited to this.

In the present embodiment, if calculated knock intensity N is larger than determination value V(KX), engine ECU 200 determines that knocking has occurred in engine 100, so it retards ignition timing. If knock intensity N is smaller than determination value V(KX), engine ECU 200 determines that knocking has not occurred in engine 100, so it advances igniting timing.

As an initial value of the determination value V(KX), a value previously defined through experimentations or the like is used. However, even in the case where same vibration is caused in engine 100 due to variation in output values of knock sensor 300 or deterioration, the intensity to be detected may fluctuate. In such a case, it is required to correct determination value V(VK) and to determine whether knocking has occurred by using a determination value V(KX) corresponding to the intensity to be detected actually.

Therefore, in the present embodiment, determination value V(KX) is corrected by using frequency distribution showing the relationship between intensity values LOG(V) which are values that intensities V for the predetermined number of ignition cycles (e.g., 200 cycles) are logarithmically converted and frequency that the intensity values LOG(V) are detected (may be called number of times or probability).

Intensities V used for calculating intensity values LOG(V) are peak values of the intensities in a predetermined crank angle.

In the frequency distribution, a median V(50), in which frequency of intensity values LOG(V) are accumulated from the minimum value and becomes 50%, is calculated. Further, a standard deviation σ in the frequency distribution is calculated. A value in which a product of a coefficient U (U is a constant, e.g., U=3) and standard deviation σ is added to median V(50) becomes a knock determination level V(KD). Frequency of intensity values LOG(V) larger than knock determination level V(KD) is determined as frequency in which knocking has occurred.

Figure 6:
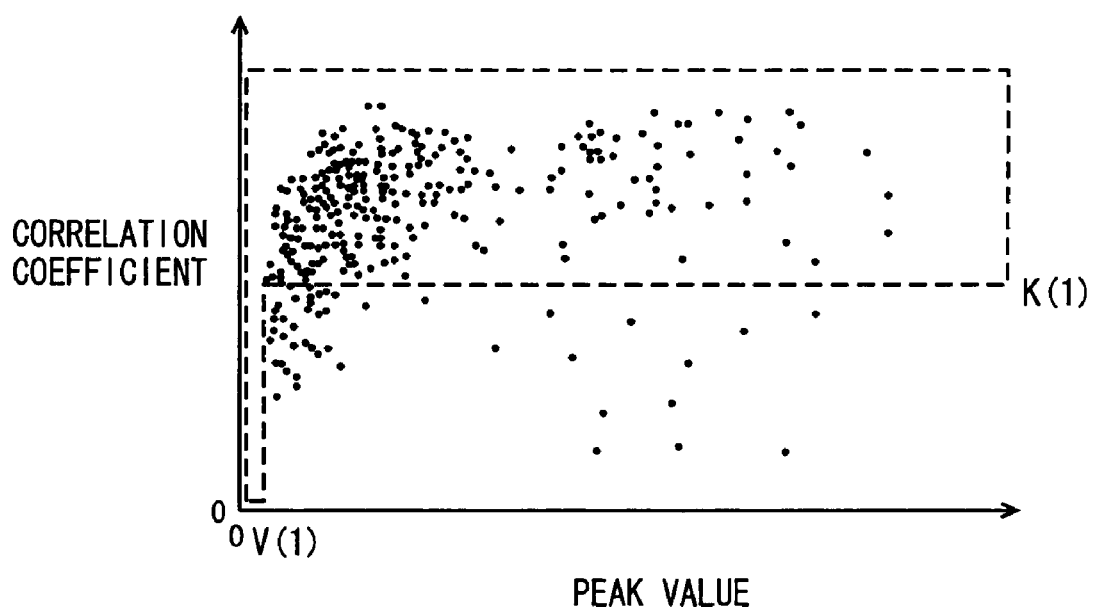
FIG. 6 is a chart showing intensity values LOG(V) used for preparing frequency distribution.

As for intensity values LOG(V) used for preparing frequency distribution, intensity values within an area enclosed by a broken line in FIG. 6 are used. FIG. 6 is a chart in which calculated intensity values LOG(V) are plotted by each correlation coefficient K in a cycle that intensity values LOG(V) are obtained.

As shown in FIG. 6, frequency distribution is prepared by excluding intensity values LOG(V) which are larger than a threshold V(1) and are calculated in an ignition cycle in which correlation coefficient K is smaller than a threshold K(1). That is, frequency distribution is prepared by using intensity values LOG(V) satisfying a condition of smaller than threshold V(1) and also intensity values calculated in an ignition cycle in which correlation coefficient K satisfying a condition that correlation coefficient K is larger than threshold K(1) is calculated.

Figure 7:
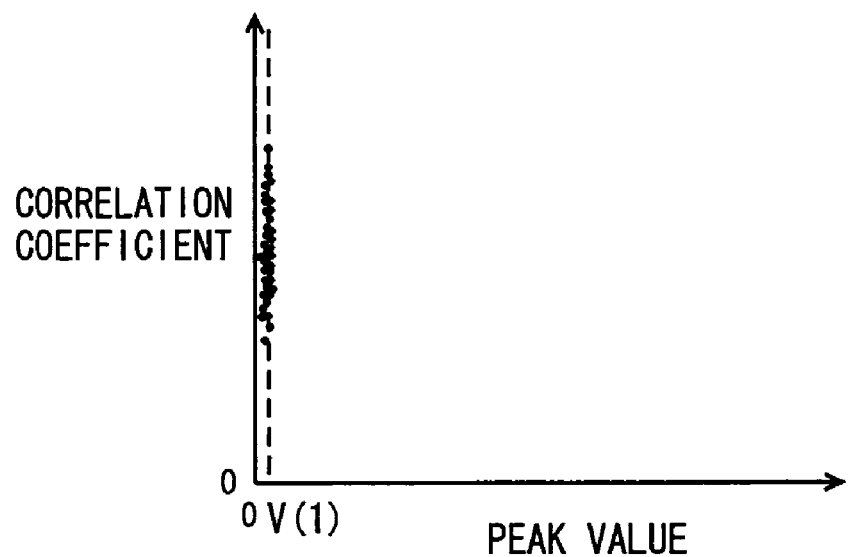
FIG. 7 is a chart showing intensity values LOG(V) when a threshold V(1) is set.

Referring to FIG. 7, threshold V(1) will be further described. FIG. 7 shows intensity values LOG(V) in the case where engine 100 is operated such that intensity V of vibration due to causes other than knocking (noise components) will not be taken in when intensity V used for calculating intensity values LOG(V) is detected.

Vibration of a noise component includes vibration due to piston slap, vibration due to operation of injector 104 (particularly direct-injection injector), vibration due to seating of intake valve 116 or exhaust valve 118, or the like.

In a gate (in a predetermined crank angle) for taking in intensity V, engine 100 is operated so as not to cause piston slap, or engine 100 is operated so as to stop injector 104, intake valve 116 and exhaust valve 118, whereby intensity values LOG(V) shown in FIG. 7 are calculated.

A median of intensity values LOG(V) calculated in this manner is set as threshold V(1). The reason why the median is set as threshold V(1) is that intensity values LOG(V) of vibration of a noise component are considered to be larger than the median. Note that a value other than the median (e.g., a value smaller than the median) may be set as threshold V(1).

Figure 8:
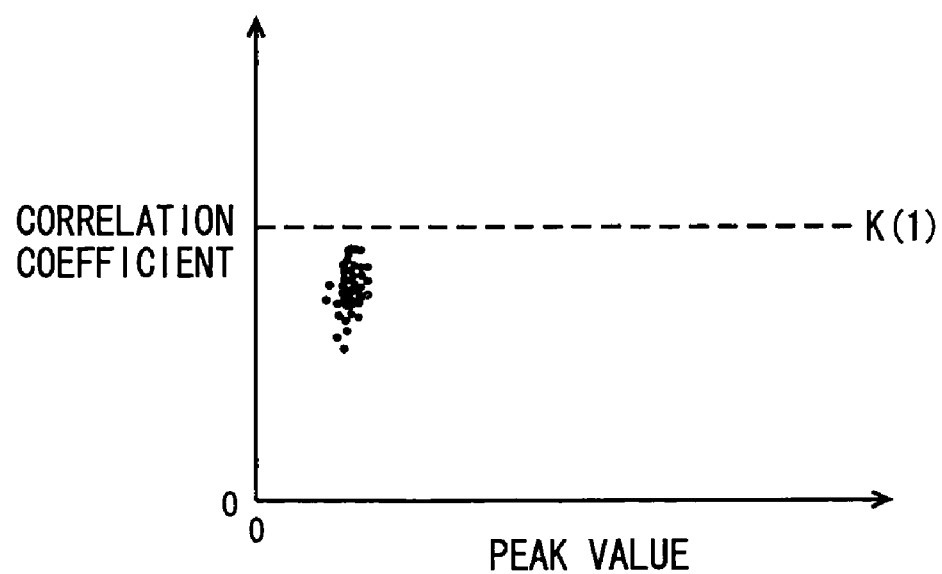
FIG. 8 is a chart showing intensity values LOG(V) when a threshold K(1) is set.

Referring to FIG. 8, threshold K(1) will be further described. FIG. 8 shows intensity values LOG(V) in the case where engine 100 is operated such that a waveform of noise is included in a vibration waveform in an ignition cycle in which intensity values LOG(V) are calculated.

In a knock detection gate, intensity values LOG(V) shown in FIG. 8 are calculated by operating engine 100 so as to cause piston slap or by operating engine 100 so as to actuate injector 104, intake valve 116 and exhaust valve 118.

The maximum value of correlation coefficient K calculated in this manner is set as threshold K(1). Note that a value other than the maximum value (e.g., a value larger than the maximum value) may be set as threshold K(1).

Figure 9:
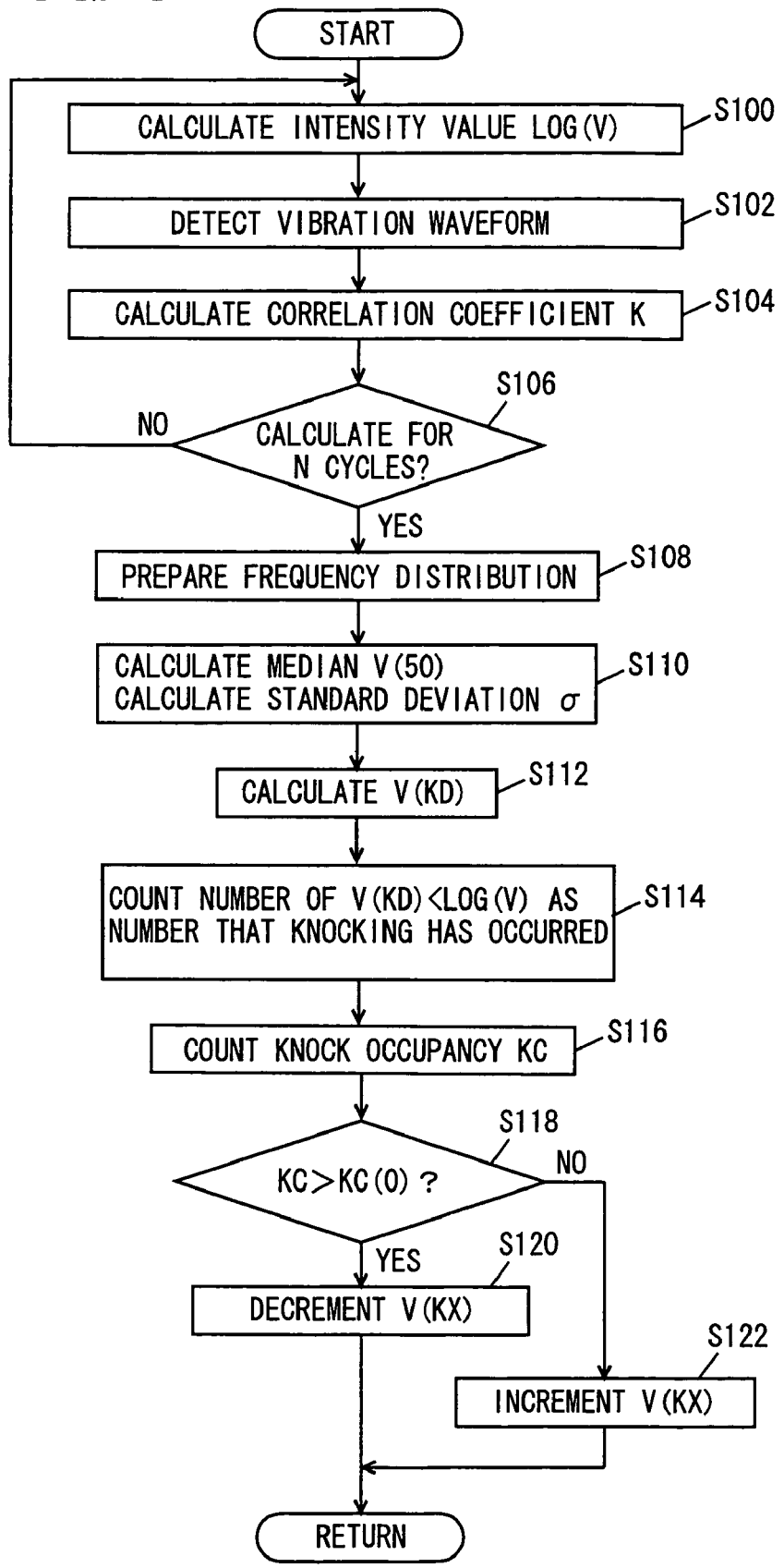
FIG. 9 is a flowchart showing the control structure of a program executed by the engine ECU of FIG. 1.

Referring to FIG. 9, a control structure of a program executed by engine ECU 200 which is the ignition timing control device of the internal combustion engine according to the present embodiment will be described.

In S100, engine ECU 200 calculates intensity value LOG (V) from intensity V detected based on a signal transmitted from knock sensor 300. Here, intensity V is a peak value in a predetermined crank angle.

In S102, engine ECU 200 detects vibration waveforms in an ignition cycle in which intensity values LOG(V) are calculated based on signals transmitted from knock sensor 300. Note that processes of S100 and S102 may be executed simultaneously.

In S104, engine ECU 200 calculates correlation coefficient K in an ignition cycle in which intensity values LOG(V) are calculated based on the detected vibration waveforms.

In S106, engine ECU 200 determines whether intensity values LOG(V) for N (N is a natural number, e.g., N=200) cycles have been calculated. When engine ECU 200 calculates N or more pieces of intensity values LOG(V) within the area enclosed by the broken line in FIG. 6, it determines that intensity values LOG(V) for N cycles are calculated. When engine ECU 200 calculates intensity values LOG(V) for N cycles (YES in S106), the processing is moved to S108. If not (NO in S106), processing is returned to S100.

In S108, engine ECU 200 prepares frequency distribution of intensity values LOG(V) in an area enclosed by the broken line in FIG. 6 described above. In S110, engine ECU 200 calculates median V(50) and standard deviation σ of intensity values LOG(V). In S112, engine ECU 200 calculates knock determination level V(KD) based on median V(50) and standard deviation σ.

In S114, engine ECU 200 counts the number of intensity values LOG(V) larger than knock determination level V(KD) as the number of times that knocking has occurred in the frequency distribution. In S116, engine ECU 200 counts a knock occupancy KC which is the proportion of number of times that knocking has occurred in N cycles. That is, engine ECU 200 counts the proportion of intensity values LOG(V) larger than knock determination level V(KD) as knock occupancy KC.

In S118, engine ECU 200 determines whether the knock occupancy KC is larger than a threshold KC(0). If the knock occupancy KC is larger than the threshold KC(0) (YES in S118), the processing is moved to S120. If not (NO in S118), the processing is moved to S122. In S120, engine ECU 200 decrements determination value V(KX). In S122, engine ECU 200 increments determination value V(KX).

Operation of engine ECU 200 of the ignition timing control device of the internal combustion engine according to the present embodiment based on the structure and the flowchart described above will be described.

When a driver operates ignition switch 312 to be turned on and engine 100 starts, intensity value LOG(V) is calculated from intensity V detected based on a signal transmitted from knock sensor 300 (S100). Further, vibration waveforms are detected (S102), and correlation coefficient K is calculated (S104).

When intensity values LOG(V) for N cycles are calculated (YES in S106), frequency distribution of calculated intensity values LOG(V) are prepared (S108). That is, frequency distribution of intensity values LOG(V) smaller than threshold V(1) and intensity values LOG(V) in an ignition cycle in which correlation coefficient K is larger than threshold K(1) is prepared.

When the frequency distribution is prepared, median V(50) and standard deviation σ of intensity values LOG(V) are calculated (S110), and based on median V(50) and standard deviation σ, knock determination level V(KD) is calculated (S112).

At this time, if intensity values LOG(V) of vibration of a noise component are mixed in intensity values LOG(V) used for preparing the frequency distribution, vibration of a noise component is caused irrespective of knocking being present or absent. Therefore, it becomes difficult to correctly determine the number of times that knocking has occurred (knocking occurrence state).

Figure 10:
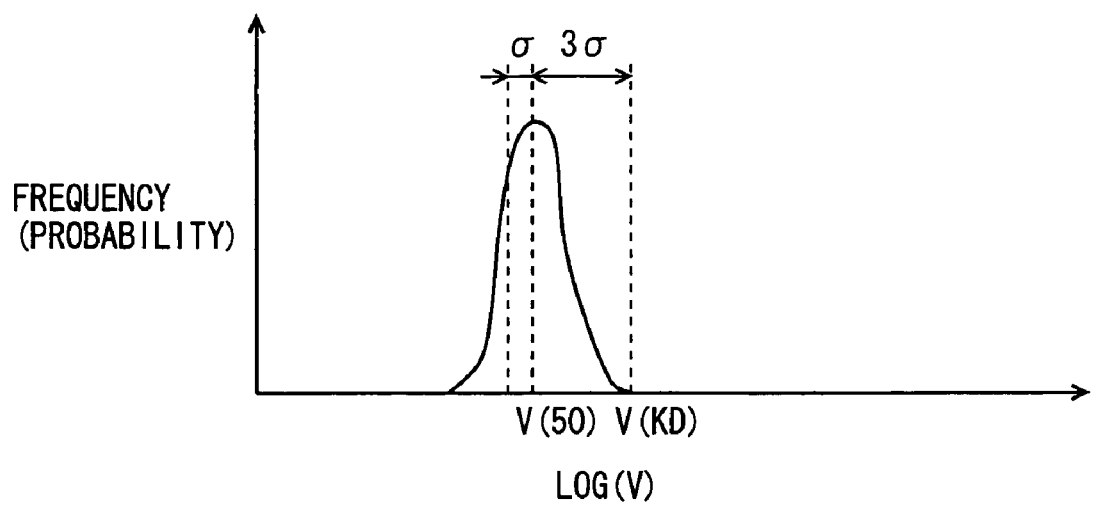
FIG. 10 is a chart showing frequency distribution prepared by using intensity values LOG(V) in which intensity values LOG(V) of vibration including a noise component are mixed.

As shown in FIG. 10, if intensity values LOG(V) of vibration of a noise component are mixed with intensity values LOG(V), frequency that large intensity values LOG(V) are calculated increases, so frequency distribution becomes a lopsided shape. In such a case, the distribution width (difference between the minimum value and the maximum value) of intensity values LOG(V) becomes narrow, so there is a case where intensity values LOG(V) larger than knock determination level V(KD) are extremely reduced. Therefore, the number of times that knocking has occurred may not be determined with high accuracy.

However, in the present embodiment, frequency distribution is prepared by using intensity values LOG(V) smaller than threshold V(1) and intensity values LOG(V) in an ignition cycle in which correlation coefficient K is larger than threshold K(1). That is, frequency distribution is prepared by excluding intensity values LOG(V) considered as intensity values of vibration of a noise component.

Figure 11:
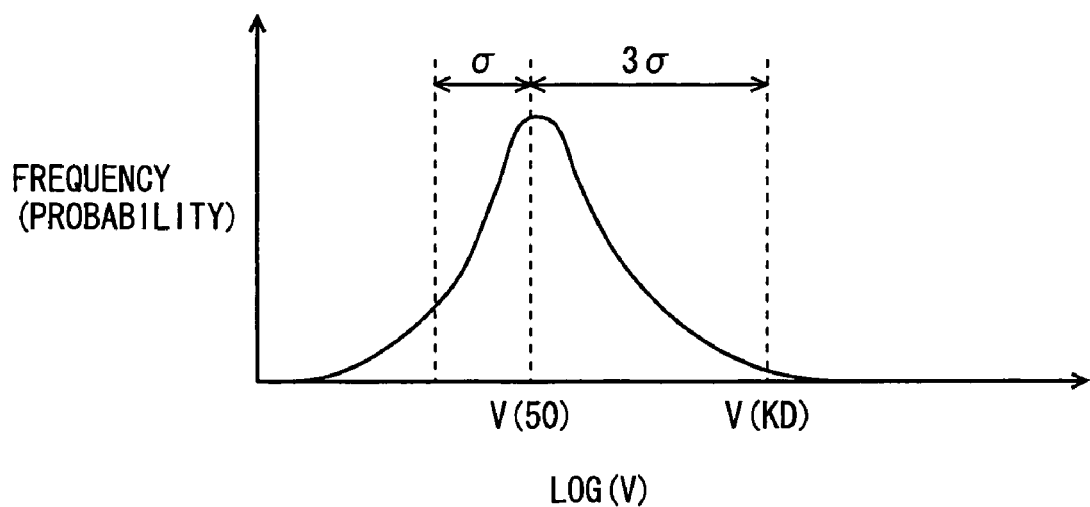
FIG. 11 is a chart showing frequency distribution prepared by using intensity values LOG(V) in which intensity values LOG(V) of vibration including a noise component are suppressed.

In this case, the frequency distribution becomes a shape close to normalized distribution, as shown in FIG. 11. In this frequency distribution, intensity values LOG(V) in an ignition cycle where knocking has occurred are large, and intensity values LOG(V) in an ignition cycle where knocking has not occurred are small. Therefore, frequency distribution in which the distribution width of intensity values LOG(V) is sufficiently large is formed. In this case, appropriate knock determination level V(KD) is calculated.

The number of intensity values LOG(V) larger than a knock determination level V(KD) is counted as the number of times that knocking has occurred (S114), and the proportion of intensity values LOG(V) larger than knock determination level V(KD) is counted as knock occupancy KC (S116).

If knock occupancy KC is larger than threshold KC(0) (YES in S118), it is said that knocking has occurred at higher frequency than the allowable frequency. In such a case, in order to make it easy to determine that knocking has occurred, determination value V(KX) is decremented (S120). Thereby, it is possible to suppress occurrence of knocking by increasing frequency that knocking is determined to have occurred and retarding ignition timing.

On the other hand, if knock occupancy KC is smaller than threshold KC(0) (NO in S118), the knocking occurrence frequency can be said as being within the allowable value. In such a case, it can be said that it is a state where output of engine 100 can be further increased.

Therefore, determination value V(KX) is incremented (S122). Thereby, it is possible to increase output of engine 100 by suppressing frequency that knocking is determined to have occurred and retarding ignition timing.

As described above, an engine ECU which is an ignition timing control device of an internal combustion engine according to the present embodiment prepares frequency distribution by using intensity values LOG(V) smaller than threshold V(1) and intensity values LOG(V) in an ignition cycle in which correlation coefficient K is larger than threshold K(1), to thereby determine the number of times that knocking has occurred. Threshold V(1) is a median of intensity values LOG(V) detected in the case of operating the engine such that intensity value V of vibration of a noise component is not taken in. Threshold K(1) is the maximum value of correlation coefficient K calculated in the case of operating the engine such that vibration waveforms of a noise components are included in vibration waveforms in an ignition cycle where intensity values LOG(V) are calculated. Thereby, it is possible to exclude intensity values LOG(V) which are considered as intensity values LOG(V) of vibration of a noise component from the calculated intensity values LOG(V). Therefore, based on intensity values LOG(V) which are considered as not intensity values LOG(V) of vibration of a noise component, the number of times that knocking has occurred can be determined. Consequently, it is possible to determine the number of times that knocking has occurred with high accuracy and to control ignition timing appropriately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ignition timing control device of an internal combustion engine, comprising:
   a first detector that detects intensity values in a plurality of ignition cycles, said intensity values relating to an intensity of vibration caused in said internal combustion engine in a predetermined first crank angle interval;
   a second detector that detects waveforms of vibration in said plurality of ignition cycles, said waveforms of vibration being caused in said internal combustion engine in a predetermined second crank angle interval;
   a storage portion that stores a model waveform of vibration of said internal combustion engine;
   a calculator portion that calculates a value relating to a deviation between said detected waveform and said stored model waveform based on a result of comparing said detected waveform with said stored model waveform; and
   a controller that controls ignition timing of said internal combustion engine based on an intensity value that is selected from said plurality of intensity values, that satisfies a predetermined first condition, and that is detected in an ignition cycle in which the value relating to the deviation between said detected waveform and said stored model waveform satisfies a predetermined second condition.

2. The ignition timing control device of the internal combustion engine according to claim 1, further comprising:
   a determiner that determines a number of times that knocking has occurred based on the intensity value that is selected from said plurality of intensity values, that satisfies the predetermined first condition, and that is detected in an ignition cycle in which the value relating to the deviation between said detected waveform and said stored model waveform satisfies the predetermined second condition,
   wherein said controller controls ignition timing of said internal combustion engine based on the number of times that knocking has occurred.

3. The ignition timing control device of the internal combustion engine according to claim 2, further comprising:
   a determination value calculator that calculates a knocking determination value based on the intensity value that satisfies said first condition and that is selected from an ignition cycle in which the value relating to the deviation between said detected waveform and said stored model waveform satisfies said second condition, wherein said determiner determines a number of times that knocking has occurred based on a number of said intensity values that are larger than said knocking determination value, that satisfy said first condition, and that are selected from an ignition cycle in which the value relating to the deviation between said detected waveform and said stored model waveform satisfies said second condition.

4. The ignition timing control device of the internal combustion engine according to claim 1, wherein said first condition is that the intensity values is smaller than a predetermined first value.

5. The ignition timing control device of the internal combustion engine according to claim 4, wherein said first value is a median of intensity values detected in a state where said internal combustion engine is operated such that vibration due to operation of a predetermined component of said internal combustion engine does not occur in said first interval.

6. The ignition timing control device of the internal combustion engine according to claim 5, wherein said predetermined component is at least one of a piston, an injector, an intake valve and an exhaust valve.

7. The ignition timing control device of the internal combustion engine according to claim 1,
wherein said value relating to a deviation between said detected waveform and said stored model waveform calculated by said calculator portion is smaller when said detected waveform includes a waveform of vibration due to operation of a predetermined component of said internal combustion engine than when said detected waveform does not include a waveform of vibration due to operation of a predetermined component of said internal combustion engine, and
wherein said second condition is that the value relating to a deviation between said detected waveform and said stored model waveform is larger than a predetermined second value.

8. The ignition timing control device of the internal combustion engine according to claim 7, wherein said predetermined second value is a maximum value of a deviation calculated in a state where said internal combustion engine is operated such that vibration due to operation of said predetermined component occurs in said second interval.

9. The ignition timing control device of the internal combustion engine according to claim 7, wherein said predetermined component is at least one of a piston, an injector, an intake valve and an exhaust valve.

10. An ignition timing control device of an internal combustion engine, comprising:
means for detecting intensity values in a plurality of ignition cycles, said intensity values relating to an intensity of vibration caused in said internal combustion engine in a predetermined first crank angle interval;
means for detecting waveforms of vibration in said plurality of ignition cycles, said waveforms of vibration being caused in said internal combustion engine in a predetermined second crank angle interval;
means for storing a model waveform of vibration of said internal combustion engine;
calculation means for calculating a value relating to a deviation between said detected waveform and said stored model waveform based on a result of comparing said detected waveform with said stored model waveform; and
control means for controlling ignition timing of said internal combustion engine based on an intensity value that is selected from said plurality of intensity values, that satisfies a predetermined first condition, and that is detected in an ignition cycle in which the value relating to the deviation between said detected waveform and said stored model waveform satisfies a predetermined second condition.

11. The ignition timing control device of the internal combustion engine according to claim 10, further comprising:
determination means for determining a number of times that knocking has occurred based on the intensity value that is selected from said plurality of intensity values, that satisfies the predetermined first condition, and that is detected in an ignition cycle in which the value relating to the deviation between said detected waveform and said stored model waveform satisfies the predetermined second condition,
wherein said control means includes means for controlling ignition timing of said internal combustion engine based on the number of times that knocking has occurred.

12. The ignition timing control device of the internal combustion engine according to claim 11, further comprising:
means for calculating a knocking determination value based on the intensity value that satisfies said first condition and that is selected from an ignition cycle in which the value relating to the deviation between said detected waveform and said stored model waveform satisfies said second condition,
wherein said determination means includes means for determining a number of times that knocking has occurred based on a number of said intensity values that are larger than said knocking determination value, that satisfy said first condition, and that are selected from an ignition cycle in which the value relating to the deviation between said detected waveform and said stored model waveform satisfies said second condition.

13. The ignition timing control device of the internal combustion engine according to claim 10, wherein said first condition is that the intensity values is smaller than a predetermined first value.

14. The ignition timing control device of the internal combustion engine according to claim 13, wherein said first value is a median of intensity values detected in a state where said internal combustion engine is operated such that vibration due to operation of a predetermined component of said internal combustion engine does not occur in said first interval.

15. The ignition timing control device of the internal combustion engine according to claim 14, wherein said predetermined component is at least one of a piston, an injector, an intake valve and an exhaust valve.

16. The ignition timing control device of the internal combustion engine according to claim 10,
wherein said value relating to a deviation between said detected waveform and said stored waveform calculated by said calculation means is smaller when said detected waveform includes a waveform of vibration due to operation of a predetermined component of said internal combustion engine than when said detected waveform does not include a waveform of vibration due to operation of a predetermined component of said internal combustion engine, and wherein said second condition is that the value relating to a deviation between said detected waveform and said stored model waveform is larger than a predetermined second value.

17. The ignition timing control device of the internal combustion engine according to claim 16, wherein said predetermined second value is a maximum value of a deviation calculated in a state where said internal combustion engine is operated such that vibration due to operation of said predetermined component occurs in said second interval.

18. The ignition timing control device of the internal combustion engine according to claim 16, wherein said predetermined component is at least one of a piston, an injector, an intake valve and an exhaust valve.

19. An ignition timing control device of an internal combustion engine, comprising:
- a knock magnitude calculator that calculates knock magnitude related to a magnitude of vibration due to knocking based on magnitude of vibration occurring in said internal combustion engine;
- a controller that controls ignition timing of said internal combustion engine based on a result of comparison between said knock magnitude and a predetermined determination value;
- a first detector that detects intensity values in a plurality of ignition cycles, said intensity values relating to an intensity of vibration caused in said internal combustion engine in a predetermined first crank angle interval;
- a second detector that detects waveforms of vibration in a plurality of ignition cycles, said waveforms of vibration being caused in said internal combustion engine in a predetermined second crank angle interval;
- a storage portion that stores a model waveform of vibration of said internal combustion engine;
- a calculator portion that calculates a value relating to a deviation between said detected waveform and said stored model waveform based on a result of comparing said detected waveform with said stored model waveform; and
- a corrector that corrects said determination value based on an intensity value selected from said plurality of intensity values, that satisfies a predetermined first condition, and that is detected in an ignition cycle in which the value relating to the deviation between the detected waveform and the stored model waveform satisfies a predetermined second condition.

20. The ignition timing control device of the internal combustion engine according to claim 19, further comprising:
- a determiner that determines a number of times that knocking has occurred based on the intensity value that is selected from said plurality of intensity values, that satisfies the predetermined first condition, and that is detected in an ignition cycle in which the value relating to the deviation between said detected waveform and said stored model waveform satisfies the predetermined second condition,
- wherein said corrector corrects said determination value based on the number of times that knocking has occurred.

21. An ignition timing control device of an internal combustion engine. comprising:
- means for calculating knock magnitude related to magnitude of vibration due to knocking based on a magnitude of vibration occurring in said internal combustion engine;
- means for controlling ignition timing of said internal combustion engine based on a result of comparison between said knock magnitude and a predetermined determination value;
- means for detecting intensity values in a plurality of ignition cycles, said intensity values relating to an intensity of vibration caused in said internal combustion engine in a predetermined first crank angle interval;
- means for detecting waveforms of vibration in said plurality of ignition cycles, said waveforms of vibration being caused in said internal combustion engine in a predetermined second crank angle interval;
- means for storing a model waveform of vibration of said internal combustion engine;
- means for calculating a value relating to a deviation between said detected waveform and said stored model waveform based on a result of comparing said detected waveform with said stored model waveform; and
- correcting means for correcting said determination value based on an intensity value that is selected from said plurality of intensity values, that satisfies a predetermined first condition, and that is detected in an ignition cycle in which the value relating to the deviation between said detected waveform and said stored model waveform satisfies a predetermined second condition.

22. The ignition timing control device of the internal combustion engine according to claim 21, further comprising:
- determination means for determining a number of times that knocking has occurred based on the intensity value that is selected from said plurality of intensity values, that satisfies the predetermined first condition, and that is detected in an ignition cycle in which the value relating to the deviation between said detected waveform and said stored waveform satisfies the predetermined second condition,
- wherein said correcting means includes means for correcting said determination value based on the number of times that knocking has occurred.

* * * * *